Feb. 6, 1968   F. X. BROWN ET AL   3,367,414
WELDED ASSEMBLY
Original Filed Nov. 25, 1960
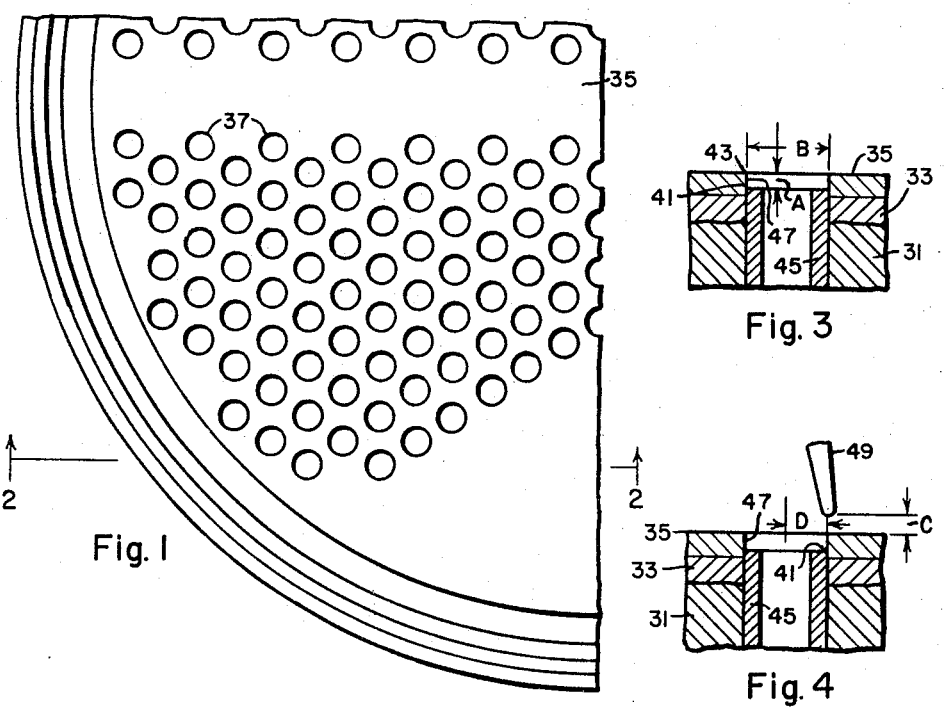
Fig. 1
Fig. 2
Fig. 3
Fig. 4
INVENTORS
Francis X. Brown and
Lorin K. Poole.
BY
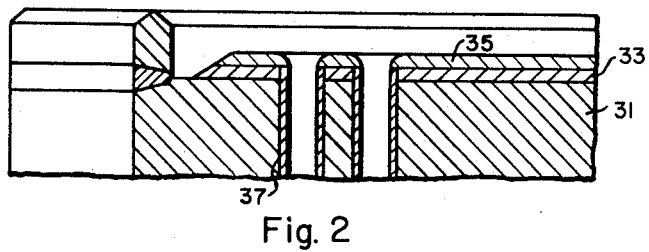
ATTORNEY

United States Patent Office 3,367,414
Patented Feb. 6, 1968

3,367,414
WELDED ASSEMBLY
Francis X. Brown, Broomall, and Lorin K. Poole, Glen Mills, Pa., assignors to Westinghouse Electric Corporation, Pittsburgh, Pa., a corporation of Pennsylvania
Original application Nov. 25, 1960, Ser. No. 71,777. Divided and this application Nov. 19, 1964, Ser. No. 412,567
4 Claims. (Cl. 165—178)

This application is a division of application Ser. No. 71,777 filed Nov. 25, 1960 now Patent No. 3,257,710 granted June 28, 1966.

This invention relates to the metals-joining art and has particular relationship to the fabrication of tube-plate or what is called tube-to-tube-sheet assemblies. Such assemblies include a plate having holes in which a plurality of tubes are secured. Such assemblies are used in heat exchangers and the like; the heat exchange takes place between a hot fluid in the tubes and a heat adsorbing fluid enveloping the outsides of the tubes.

A demand has arisen for a tube-plate assembly in which the leakage of the fluid from within the tubes into the heat-absorbing fluid is positively prevented. This requires that the tubes be sealed fluid-tight to the plate and that the tube-to-plate joint and the tubes themselves remain fluid-tight in the use of the assembly.

In accordance with the teachings of the prior art, tube-plate assemblies were made by direct fusion arc-welding with a non-consumable electrode of the tubes to the rims of the holes in the plate, by arc welding the rims of the holes in the plate to the adjacent ends of the tubes with a manual coated electrode, and by fusion arc welding with a non-consumable electrode of a filler ring or the equivalent to the joint between the rims of the holes and the adjacent ends of the tubes. The assemblies produced with the first of the above methods were found to have an excessive number of gas holes and cracks. The second method was found to be excessively costly; in addition difficulty was experienced in maintaining a proper bead contour and an excessive number of small leaks appeared in the joints. While the third of the above-described methods yielded useable assemblies, this method was found to lack adequate positive reliability for wide industrial use; in addition it was found that some of these assemblies were of relatively short life. Several heat exchangers with tube plate assemblies made in the practice of the third method developed leaks in the field.

It is then an object of this invention to provide fluid-tight tube-plate assemblies which shall have adequate positive reliability for wide industrial use. It is a specific object of this invention to provide tube-plate assemblies made by welding the tubes to the rims of holes in the plate in which the welds shall be substantially free of leaks and cracks and which shall have a relatively long life in use.

This invention arises from the discovery that the leaks and cracks in the tube-sheet assemblies made in accordance with the teachings of the prior art arise from failure to coordinate the metallurgical and mechanical properties of the materials forming the welded joints. An important aspect of this discovery is that the use of like materials for the tubes and the plate does not achieve this coordination. To achieve the desired metallurigical and mechanical coordination changes must be made in the metallurgy of one or the other.

It has also been found that the short life which has been experienced in initially acceptable assemblies is caused by corrosion of the tubes at, and adjacent to, the welds. In the making of the assemblies in accordance with the third of the above-described methods (and usually in accordance with the other two) each tube is inserted in its corresponding hole with the end of the tube extending above the rim of the hole and a weld is produced between the rims of the hole and the tube. It has been discovered that during the welding operation an inwardly extending projection is formed at the joint, in effect producing a Venturi channel. This channel causes the hot fluid which passes through the tubes to be turbulent at or near the joints and the turbulence causes the tubes to be corroded at or near the joints and to develop leaks. This corrosion is particularly severe in the case of pressurized water frequently encountered in practice which is present in the tubes at pressure of about 2000 pounds per square inch and at a temperature of about 600° F.

In accordance with this invention the mechanical and metallurigical properties of the tubes and plate are coordinated by selecting material for the portion of the plate forming the joints which while different than the material of the plate is weld compatible with the plate. The tubes or the portions of the tubes forming the joint are also of different material than the overlay forming the joint.

The expression "weld compatibility" as used in this application with reference to the specific aspects of this invention, refers to weld compatibility between a first material and a second material which is different than the first and means that when these materials are melted or fused while in contact and then permitted to cool there is substantial mutual solid solubility of each material in the other. Essentially the two materials should have the same melting-solidification temperature ranges within about 300 Fahrenheit degrees. The desired solid solubility is not achieved by welding like materials; one of the materials must be changed. Typically in the welding of stainless or austenitic steels, the materials must be different. To achieve crack-free joints the proper balance of ferrite to austenite must be maintained and this balance is achieved by fusing different materials which contribute the austenite and the ferrite in the proper proportions. Item I of Table I typifies another situation in which the materials are different. In this case the overlay is a low carbon, high manganese, high silicon steel with a small quantity of powerful deoxidizer while the base plate and tube are both of killed carbon steel. The manganese and silicon components and the deoxidizer suppress the formation of gaseous oxides ($CO_2$) and thus prevent the developing of cracks and porosity. With reference to the broader aspects of this invention, the expression "weld compatibility" may refer to compatibility between like materials.

It is usually not economically feasible to select the plate and the tubes themselves of compatible but different materials although such selection is within the scope of this invention in its broader aspects. In the practice of this invention in its more specific aspects the compatibility is achieved by overlaying a base plate with overlays of materials each of which are compatible with the adjacent material or materials; the material of the most remote overlay from the base plate being compatible with the material of the tube. The tube is joined to this most remote overlay. Thus a completely compatible tube-plate assembly is produced.

The following Table I presents the compositions of base plate, tubes and overlays which have been produced in the practice of this invention and have been found to yield highly satisfactory results:

TABLE I

| Item | Type Identification Plate | Composition Plate | Type Identification Tube | Composition Tube | Overlay |
|---|---|---|---|---|---|
| 1 | ASTM A266, A105 | Killed Carbon Steel | ASTM A210, A179 | Killed Carbon Steel | Steel-Mn .60 to .90 C 06, Si .75 to 1.00; small quantity of powerful deoxidizer such as Al. Overlaid by submerged arc welding with a rimmed steel electrode and a flux containing alloy elements and deoxidizers. |
| 2 | ASTM A266, A105 | do | Cu-Ni or Monel | 90 Cu-10 Ni or 80 Cu-20 Ni or 70 Cu-30 Ni or 70 Ni-30 Cu, in effect then 30 to 90 Cu, 70 to 10 Ni. | 1st layer MIL-EN61 C .15; Mn 1.00; Fe 1.00; S .01; Si .75; Cu .25; Al 1.5; Ti 2-3.5; Miscellaneous elements, .5; Remainder Ni plus small percent Co.<br><br>2nd layer and 3rd layer [1] MIL-EN60C .15; Mn 1.00; Fe 2.5; S, 02; Si 1.5; Ni plus small percent cobalt, 62 to 69; Al 1.25; Ti 1.5-3; Misc. elements .5; Remainder Cu. Overlaid by consumable electrode inert-gas welding. (Too deep penetration should be avoided and for this purpose electrode is oscillated as deposit proceeds.) |
| 3 | ASTM A266, A105 | do | International Nickel Co. Inconel Alloy. | | 3 layers all same. MIL-EN-6A C .10; Mn 2-2.75; Fe 10; S .015; Si .35; Cu .5; Ti 2.5-3.5 Cr 14-17; Misc. elements .5; Ni+Co—Remainder but not less than 67. or |
| 4 | ASTM A266, A105 | do | do | | MIL-EN 87 C 10; Mn 2.5-3.5; Fe 3.00; S.015; Si .50, Cu .50; Ni 67—minimum Co.10; Cb+Ta 2.00-3.00 but Ta max. only .3; Ti .75; Cr 18—22 (Same process as for Cu Ni Item 2). |
| 5 | ASTM A266, A105 | do | AISI Type 304 Stainless Steel. | | First layer. Overlaid by series submerged arc weld between electrodes of AISI 309 and 312 stainless steel-adjacent plate. Second layer. Overlaid by series submerged arc weld between 308L stainless steel electrodes.[2] |
| 6 | Silicon Bronze ASTM-B94. | | Admiralty Metal | | No overlay. |

[1] Tube joined to second and third layer.
[2] Tube joined to second layer.

The data under Overlay in Table I is the composition determined by actual analysis of a specimen of the overlay.

The assemblies listed in Table I are throughout weld compatible.

Thus in the case of item 2 there is substantial mutual solid solubility between the nickel alloy of the first layer and the carbon steel; there is also substantial mutual solid solubility between the nickel-copper (Monel) alloy of the second layer and the nickel alloy of the first layer and also both between the nickel-copper alloy of the second and third layer and the alloy of the tube.

In the case of the two-or-three-layer overlays the first layer may be eliminated if the penetration of the overlay of the other layers could be maintained low. This requires excessive care in actual manufacture and for this reason the two-or-three-layer overlay is preferred.

Table I shows that in producing a tube-plate assembly where the tubes and plates are both of carbon steel, compatibility is achieved with an overlay of manganese-silicon steel having a powerful deoxidizer. Where the tubes are stainless steel type 304 and the base plate carbon steel, a first layer combining 309 and 312 stainless is deposited on the steel and a second layer of 308L stainless is deposited on the first layer. The tubes are welded to the second layer. In this case the balance in the weld between the chromium and other ferrite forming elements and nickel and other austenite forming elements must be such as to suppress cracking. The joining of tubes of type 304 stainless to a plate of type 304 stainless would not yield a non-porous crack-free assembly among other reasons because the required relationship of ferrite to austenite in the joint would not be achieved.

To eliminate the turbulence smooth joints without inwardly extending projections are produced. This object is achieved by mounting each tube in its corresponding hole with its rim extending below or within the rim of the hole. The tube is initially a slip fit in the hole but the end of the tube adjacent the rim in the hole is expanded so that the tube firmly engages the boundary of the hole to which it is to be welded.

The joining in each case is effected by fusion arc welding with a non-consumable electrode in a shield of inert gas. The welding may be carried out with the apparatus disclosed in a Patent 3,064,120 granted Nov. 13, 1962, to Richard P. Ache for Welding Apparatus, and assigned to Westinghouse Electric Corporation or similar apparatus.

Assemblies covered by each item of the Table I have been made as just described and have been successfully qualified both as to welding procedure and as to welders (welding operators). In qualifying as to procedure at least 25 welds corresponding to each item of the Table were made in a test plate. A section of this plate about ⅜″ to ½″ below the welds is then cut. This section is X-rayed to determine if it is free of porosity. In each test all the welds of each test section were found to be unusually porosity free. This section is then dye-penetrant tested to determine if cracks are present. No cracks were found in any of the test sections. Each section is then cut along the diameters of the lines of tubes and the thickness of the welds at their minimum thicknesses are measured at four points on each of the twenty-five welds. In all measurements the welds were at least .9 times the thickness of the tube wall. Micro sections of all twenty-five welds are viewed for flaws. Micro sections of randomly selected welds are viewed for micro cracks particularly at the roots of the welded joints. The test welds were found to be free of flaws and micro cracks. The procedure is qualified in this way for each separate gauge of tube.

Welders (welding personnel) are qualified for each separate gauge of tube. For the first qualification twenty-five welds are made in a plate and a section similar to the above of each plate is X-rayed, dye-penetrant tested, micro viewed, and subjected to thickness measurement as above. For each subsequent qualification 10 welds are made and tested as above. About twelve welders have been qualified thus far.

Fourteen satisfactory feed water heaters with tube-plate assemblies in accordance with this invention have been made thus far in the practice of this invention. In these assemblies the welds are sound and there are no inwardly extending projections which would produce turbulence of the heated water.

Additional understanding of this invention both as to its organization and as to its method of operation and use and as to additional objects and advantages thereof will be obtained from the following description of specific embodiments taken in connection with the accompanying drawings in which:

FIG. 1 is a view in front elevation of a tube-plate assembly in accordance with this invention;

FIG. 2 is a view in section taken along line III—III of FIG. 1;

FIG. 3 is a view in section showing a tube and a portion of the plate preparatory to the welding operation; and, FIG. 4 is a view in section showing a tube and portion of the plate and the welding electrode as they are related during a welding operation.

FIGS. 1 and 2 show a tube-plate assembly in accordance with this invention. This assembly includes a base plate 31, for example of carbon steel, on which a plurality of layers 33 and 35 of an overlay are deposited. Depending on the tube material the overlay may be of manganese-silicon steel with a powerful deoxidizer (for a carbon or steel tube) or a copper-nickel alloy or a nickel-copper alloy like Monel metal. The tubes 37 are secured in holes in the overlay by arc welding.

In making the tube-plate assembly shown in FIGS. 1 and 2, the base plate is overlaid and then drilled. The tubes are then inserted in the holes. With reference to FIG. 4 the following Table II shows the tube dimensions, the hole dimensions and the spacing of the tube rim 41 below the adjacent rim 43 of the hole for an assembly including tubes of Monel metal and copper-nickel alloys.

TABLE II

| Tube Material | Tube Size | | "A" Dimension (in.) | "B" Dimension (in.) |
|---|---|---|---|---|
| | O.D. (in.) | Wall | | |
| Monel | ⅝ | *17–18 BWG | 0.055–0.065 | 0.630–0.650 |
| 90–10 CuNi | ⅝ | 17–18 BWG | 0.055–0.065 | 0.630–0.650 |
| 70–30 CuNi | ⅝ | 17–18 BWG | 0.055–0.065 | 0.630–0.650 |
| Monel | ⅝ | 15–16 BWG | 0.055–0.065 | 0.630–0.650 |
| 90–10 CuNi | ⅝ | 15–16 BWG | 0.055–0.065 | 0.630–0.650 |
| 70–30 CuNi | ⅝ | 15–16 BWG | 0.055–0.065 | 0.630–0.650 |

\* Birmingham wire gauge.

The tube 45 should be a slip fit in the hole 47. Typically, a hole is maintained between .631 and .633 inches and the outside diameter of a tube between .620 and .630. Preferably the tube rim 41 should be square and not tapered to provide adequate thickness for the fusion weld.

FIG. 4 and the associated following Table III show relationship between the electrode 49 and each tube 45 in the plate 47 and the welding parameters during the welding operation:

OPERATIONS (1) Preparation for Welding
(2) Tube Welding Procedure
(3) Post Weld Inspection

*(1) Preparation for welding*

(1) Prior to welding, both the plate and the tubes are properly prepared.

(2) Tubes are rolled to a plastic deformation of 2% to 4% by retractive rolling the full depth of the plate less one-eighth-of-an-inch. A minimum amount of water soluble "Lube-A-Tube" lubricant is used.

(3) After rolling, the tube ends are cut off below the plate. For depth see Table II. The cut off tool is electrically driven to avoid contaminating the tube end. No lubricant is used for this operation.

(4) After cut-off the inside of the tube end are deburred using a hand reamer.

(5) The plate is thoroughly cleaned of all dirt, grease, oil, and chips after the tube ends have been prepared for welding and the plate shall then be covered with heavy cardboard to insure cleanliness. Thorough cleaning is highly important.

*(2) Tube welding procedure*

(1) The unit is placed in the vertical position with the plate horizontal for welding.

(2) No preheat is required, except that the plate temperature shall not fall below 70° F.

(3) Immediately prior to positioning of the welding torch, the tube to be welded is snugged against the tube hole using a tapered drift.

(4) Welding is done with a machine having a high frequency arc starting attachment and an arc tapering attachment. The welding is done using D.C. straight polarity.

(5) Interpass temperature does not exceed 150° F. as measured by a calibrated contact pyrometer.

(6) Welding current, voltage, gas flow, and rotation time are as specified in Table II for the tube gauge (Birmingham Wire Gauge) and material being welded.

(7) Before each shift two welds are made on a test block to determine that the equipment is functioning properly.

*(3) Post weld inspection*

(1) After the welding has been completed the welds are cleaned of all scale and oxide and inspected visually with a 5× lens for voids, cracks, non-fusion etc. Defects may be repaired. Small defects may be rewelded. In the case of large defects filler may be added.

(2) After all repairs have been made the completed plate is subjected to a penetrant examination.

The above-described method has resulted in highly satisfactory porosity-free crack-free long-life assemblies. While preferred embodiments of this invention have been

TABLE III

| Tube Material | Tube Size | | Gas Flow CFH, Argon | Current, Amperes | Rotation Speed (Sec./Rev.) | Dimension "C" (in.) | Dimension "D" (in.) |
|---|---|---|---|---|---|---|---|
| | O.D. (in.) | Wall | | | | | |
| Monel | ⅝ | 17–18 BWG | 10 | 85–90 | 45 | 0.030–.040 | 0.320 |
| 90–10 CuNi | ⅝ | 17–18 BWG | 10 | 85–90 | 45 | 0.030–.040 | 0.320 |
| 70–30 CuNi | ⅝ | 17–18 BWG | 10 | 85–90 | 45 | 0.030–.040 | 0.320 |
| Monel | ⅝ | 15–16 BWG | 10 | 85–90 | 45 | 0.030–.040 | 0.320 |
| 90–10 CuNi | ⅝ | 15–16 BWG | 10 | 85–90 | 45 | 0.030–.040 | 0.320 |
| 70–30 CuNi | ⅝ | 15–16 BWG | 10 | 85–90 | 45 | 0.030–.040 | 0.320 |

The plate is placed horizontally on a table and the electrode 49 is held at an angle of about 10° to the vertical and at a trailing angle of about 5°.

In detail a typical operation is carried out as follows:

disclosed herein many modifications thereof are feasible. This invention then is not to be restricted except insofar as is necessitated by the spirit of the prior art.

What is claimed:

1. A fluid-tight tube-plate assembly comprising a plate of a first material having an overlay consisting at least of a first layer of a second material and of a second layer of a third material and a plurality of tubes in holes in said plate, the rim of each of said holes being joined to the rims of the corresponding tube by a weld to the second layer of said overlay, there being substantial mutual solid solubility between said first material and said second material, between said second material and said third material, and between said third material and the material of each of said tubes, said first material being metallurgically joined throughout to said second material and said second material being metallurgically joined throughout to said third material, and said third material being metallurgically joined to said tubes.

2. A fluid-tight tube-plate assembly particularly for a heat exchanger comprising a plate of a first material having an overlay consisting of a plurality of layers of different materials and a plurality of tubes in holes in said plate, the rim of each of said holes being joined to the rim of the corresponding tube in the layer most remote from said plate, there being substantial mutual solid solubility between the material of said layer in contact with said plate and said first material, between the material of each layer and the material of the layer or layers with which it is in contact, and betwen the material of said remote layer and the material of said last-named tube, said plate being metallurgically joined throughout to said layer in contact with said plate and each said layer being metallurgically joined throughout to the adjacent layer and the layer most remote from said plate being metallurgically joined to said tubes.

3. A fluid-tight tube-plate assembly comprising a plate of carbon steel having at least one overlay, the composition of which includes in excess of 60% nickel and cobalt, the quantity of cobalt being relatively small, said overlay being metallurgically joined to said carbon steel, and tubes in said plate, said tubes being composed of an alloy of nickel and copper having about 30% to 90% copper and 70% to 10% nickel, said tubes being joined to the plate by pressure-tight welds to said overlay.

4. A fluid-tight tube-plate assembly in which the plate has an overlay, the plate, tubes and overlay having substantially compositions as follows:

Plate—killed carbon steel
Tube—30 to 90% Cu, 70 to 10% Ni
Overlay—first layer:
    C—.15%
    Mn—1.00%
    Fe—1.00%
    S—.01%
    Si—.75%
    Cu—.25%
    Al—1.5%
    Ti—2 to 3.5%
    Miscellaneous elements—.5%
    Ni plus small percent
    Cu—remainder
Overlay—second and third layer:
    C—.15%
    Mn—1.00%
    Fe—2.5%
    S—.02%
    Si—1.5%
    Ni plus small percent Co 62–69%
    Al—1.25%
    Ti—1.5 to 3%
    Miscellaneous elements—.5%

References Cited

UNITED STATES PATENTS

| | | | |
|---|---|---|---|
| 2,537,207 | 1/1951 | Carlson et al. | 29—196.1 |
| 2,562,467 | 7/1951 | Kinnear | 29—196.1 X |
| 2,618,846 | 11/1952 | Morris et al. | 29—157.4 |
| 2,785,459 | 3/1957 | Carpenter | 285—286 X |
| 2,868,513 | 1/1959 | Orr et al. | 165—83 X |
| 2,914,346 | 11/1959 | Ryder | 285—189 |
| 2,928,166 | 3/1960 | Worn et al. | 29—157.5 |
| 2,962,308 | 11/1960 | Hawthorne | 285—286 X |
| 3,078,551 | 2/1963 | Patriarca et al. | 285—286 X |

OTHER REFERENCES

Fragetta et al.: The Welding of Inconel for Nuclear-Power Applications, Welding Journal, April 1959 (pp. 347–355).

ROBERT A. O'LEARY, *Primary Examiner.*

CHARLES SUKALO, *Examiner.*

T. W. STREULE, *Assistant Examiner.*